United States Patent
Iwato et al.

(10) Patent No.: US 6,709,504 B2
(45) Date of Patent: Mar. 23, 2004

(54) EMULSION AND WATER-REPELLENT COMPOSITION

(75) Inventors: Satoko Iwato, Tokyo (JP); Mureo Kaku, Tochigi (JP)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/258,314

(22) PCT Filed: May 18, 2001

(86) PCT No.: PCT/US01/16282

§ 371 (c)(1), (2), (4) Date: Oct. 18, 2002

(87) PCT Pub. No.: WO01/90267

PCT Pub. Date: Nov. 29, 2001

(65) Prior Publication Data

US 2003/0212196 A1 Nov. 13, 2003

(30) Foreign Application Priority Data

May 25, 2000 (JP) ........................................ 2000-155281
May 19, 2000 (JP) ........................................ 2000-148885

(51) Int. Cl.$^7$ ................................................ C08G 77/08
(52) U.S. Cl. ........................... 106/287.13; 106/287.16; 528/23; 528/14; 528/39; 528/42; 528/13; 528/21; 528/12

(58) Field of Search ........................ 106/287.13, 287.16; 528/23, 14, 39, 42, 12, 13, 21

(56) References Cited

U.S. PATENT DOCUMENTS

| | | | |
|---|---|---|---|
| 4,648,904 A | | 3/1987 | DePasquale et al. |
| 4,757,106 A | | 7/1988 | Mayer et al. |
| 4,990,377 A | | 2/1991 | Wilson |
| 5,196,054 A | | 3/1993 | Schmuck et al. |
| 5,274,159 A | * | 12/1993 | Pellerite et al. ............. 556/485 |
| 5,442,011 A | | 8/1995 | Halling |
| 5,547,711 A | | 8/1996 | Kirchmeyer et al. |
| 5,550,184 A | | 8/1996 | Halling |
| 5,644,014 A | | 7/1997 | Schmidt et al. |
| 5,739,369 A | | 4/1998 | Matsumura et al. |

FOREIGN PATENT DOCUMENTS

| | | |
|---|---|---|
| EP | 0 748 357 B1 | 6/1999 |
| JP | 06 248259 | 6/1994 |
| JP | 11-181355 A | 7/1999 |
| WO | WO 99 29636 A1 | 6/1999 |

* cited by examiner

Primary Examiner—Margaret G. Moore

(57) ABSTRACT

A composition having water-repellency at high temperature is provided. Some of the invention compositions also exhibits oil-repellency at high temperature. The composition comprises a fluorocarbon silane or hydrolyzate thereof; a surfactant; a polymerizable, silicon-containing compound; and a catalyst.

26 Claims, No Drawings

EMULSION AND WATER-REPELLENT COMPOSITION

FIELD OF THE INVENTION

The present invention relates to an emulsion composition comprising a fluorocarbon silane or hydrolyzate thereof and coated composition produced therefrom.

BACKGROUND OF THE INVENTION

Some silane-containing aqueous solutions that can provide water-repellent characteristics on the surface of a substrate have been disclosed. See, e.g., U.S. Pat. Nos. 4,648,904, 4,757,106, 4,990,377, 5,196,054, 5,550,184, and 5,664,014, European Patent 0 748 357, and Japanese Kokai Patent Application No. Hei 11(1999)-181355.

For example, U.S. Pat. No. 5,550,184 discloses reactive hydrolyzed silane emulsions produced by emulsifying a hydrolyzable alkoxysilane in water in the presence of a high HLB value emulsifier to simultaneously retain the hydrolyzable alkoxysilane in substantially totally hydrolyzable state. The emulsion can produce durable coatings that impact water-repellent characteristics on a substrate.

Japanese Kokai Patent Application No. Hei 11(1999)-181355 discloses an emulsion containing a specific type of silane hydrolyzate, a specific type of silicate a substance, and a surfactant. The emulsion, however, requires pH adjustments to alkaline region in order to exhibit water-repellency and heat resistance characteristics.

Therefore, it is desirable to develop a new emulsion or coating containing the emulsion that does not require the alkaline pH adjustment to exhibit the desired heat-resistance and water-repellency properties.

Additionally, though these emulsions exhibit water-repellency characteristics, they do not exhibit oil-repellent property. For example, glass window of oven, range, or toaster can be coated with a layer formed by an emulsion having good water repellency at high temperature, but it has a poor oil-stain resistance. Therefore, it is also highly desirable to develop an emulsion that can exhibit both water-repellent and oil-repellent properties for a variety of applications.

Therefore, it is desirable to develop a new emulsion or coating containing the emulsion that does not require the alkaline pH adjustment, or without the need of metal hydroxide or the chemicals disclosed above, to exhibit the desired heat-resistance and water-repellency properties.

Additionally, though these emulsions exhibit water-repellency characteristics, they do not exhibit oil-repellent property. For example, glass window of oven, range, or toaster can be coated with a layer formed by an emulsion having good water repellency at high temperature, but it has a poor oil-stain resistance. Therefore, it is also highly desirable to develop an emulsion that can exhibit both water-repellent and oil-repellent properties for a variety of applications.

SUMMARY OF THE INVENTION

A composition comprises a fluorocarbon silane or hydrolyzate thereof; a surfactant; a polymerizable, silicon-containing compound; and a catalyst.

DETAILED DESCRIPTION OF THE INVENTION

The fluorocarbon silane generally contains at least one hydrolyzable fluorocarbon silane and can be represented by $R_f$—$(CH_2)_p$—$Si\{$—$(O$—$CH_2CH_2)_n$—$OR'\}_3$ where $R_f$ can be one or more $C_{3-18}$ perfluoroalkyl groups, each R' can be the same or different and is independently a $C_{1-3}$ alkyl groups or combinations thereof, p=2–4, and n=2–10). The preferred $R_f$ is mixed perfluoroalkyl groups of 8 to 18 carbons.

Examples of the fluorocarbon silanes include, but are not limited to, perfluoroalkylethyltris (2-(2-methoxyethoxy)ethoxy)silane when n is 2, and perfluoroalkylethyltris (2-(2-(2-methoxyethoxy)ethoxy)ethoxy)silane when n is 3, and combinations thereof. These fluorocarbon silanes are either commercially available or can be produced by any means known to one skilled in the art as disclosed in Kir-Othmer Encyclopedia of Chemical Technology, $3^{rd}$ edition, vol. 20. For example, the fluorocarbon can be produced by the method disclosed in U.S. Pat. No. 5,550,184, disclosure of which is incorporated herein by reference.

Any surfactant that can emulsify the hydrolysis product of the fluorocarbon silane can be used. The surfactant generally is a surfactant having an HLB value sufficiently high to inhibit self-condensation of the fluorocarbon silane hydrolysis product. The term "HLB" refers to the HLB system published by ICI America's, Inc., Wilmington, Del.; Adamson, A. W., "Physical Chemistry of Surfaces", $4^{th}$ edition, John Wily & Sons, New York, 1982). The surfactant can be anionic, cationic, nonionic, amphoteric, or combinations thereof. The preferred surfactants are those with HLB values greater than 12, more preferably greater than 16. Generally, the lower HLB value the surfactant is, the larger amount of the surfactant is required to stabilize the emulsion. Two or more miscible surfactants generally can also be combined or mixed for use as long as they are surfactants having HLB values sufficiently high to inhibit self-condensation of the fluorocarbon silane hydrolysis products.

The HLB value of a nonionic surfactant can be determined by calculation with a formula, among others, originated by Griffin of Atlas Co. (now ICI America) in the U.S. However, in the case of the anionic type or the cationic type, a method for determination by calculation of the HLB value is not available to date. Nevertheless, paying attention to the fact that changes in emulsification characteristics are sensitive to changes in the HLB value, Atlas Company established and published a method for the experimental determination of the HLB value by an emulsification experiment on standard oil. Companies other than Atlas have also established methods for experimental determination of HLB value. However, it can be clarified by the adoption of any experimental method that the HLB value of the anionic type or the cationic type is greater than 16.

Examples of nonionic surfactants include, but are not limited to, $R'_f$—$CH_2CH_2$—$O$—$(CH_2CH_2O)_{11}$—$H$, $C_9H_{19}$—$C_6H_4$—$O$—$(CH_2CH_2O)_{50}$—$H$, other nonionic surfactants, and combinations thereof Examples of cationic surfactants include, but are not limited to $R'_f$—$CH_2CH_2SCH_2CH(OH)CH_2N(CH_3)_3{}^+Cl^-$, other cationic surfactants, and combinations thereof. Examples of anionic surfactants include, but are not limited to, $C_{12}H_{25}(OCH_2CH_2)_4OSO_3{}^-NH_4{}^+$, $C_{12}H_{27}$—$C_6H_4$—$SO_3{}^-Na^+$, other anionic surfactants, and combinations thereof. In each of the formulae, $R_f'$ is a perfluoroalkyl group generally having about 3–18 carbon atoms. The preferred surfactants are nonionic surfactants having polyethylene glycol in the molecular chain.

The content of the fluorocarbon silane in the water-based emulsion can be about 0.1 weight % or higher, preferably about 2–20 weight %, and most preferably 7–15 weight %, based on the total weight of the emulsion. The weight ratio of the fluorocarbon silane to the surfactant can be in the range of from about 1:1 to about 10:1, preferably about 10:2 to about 10:5, and even more preferably 10:3.

Any polymerizable, silicon-containing compound can be used so long as it can copolymerize with the fluorocarbon silane hydrolysis product to improve heat-resistant water-repellent characteristics, heat-resistant oil-repellent characteristics, or both. Suitable polymerizable, silicon-containing compounds include silicates, organosilanes, or combinations thereof.

A suitable silicate can have the formula of Si—$R_4$ where R is one or more groups selected from the group consisting of $OCH_3$, $OCH_2CH_3$, $(OCH_2CH_2)_mOCH_3$, and combinations thereof in which m=1–10, preferably 1–3. Because a silicate represented by Si—$((OCH_2CH_2)_mOCH_3)_4$ (m=1–3) is water-soluble, it can dissolve in a water-based emulsion containing a fluorocarbon silane hydrolysis product in a relatively short time, the silicate represented by Si—$((OCH_2CH_2)_2OCH_3)_4$ is presently preferred.

The silicate to the fluorocarbon silane molar ratio can be in the range of from about 0.3:1 to about 10:1, preferably 0.3:1 to 5:1, and most preferably 0.4:1 to 2:1 Suitable organosilane include organoalkoxysilanes having the formula of $R^2_q Si(OR^3)_{4-q}$ where each $R^2$ can be independently an alkyl group having 1 to about 10 carbon number; each $R^3$ can be the same or different and each is independently an alkyl group having 1 to about 3 carbon number; and q=1–3. Examples of suitable organosilanes include, but are not limited to, methoxysilanes, ethoxysilanes, propoxysilanes, and combinations thereof.

The molar ratio of organoalkoxysilane to fluorocarbon silane can be in the range of from about 0.3:1 to about 10:1, preferably 0.3:1 to 5:1, and most preferably 0.4:1 to 2:1.

The catalyst can be either an acid or a pH-adjusting agent. An aqueous acid such as phosphoric acid, boric acid, hydrochloric acid, sulfuric acid, nitric acid, acetic acid, oxalic acid, or combinations thereof can be used as acid for the composition.

The presently preferred catalyst, if a silicate is used as silicon-containing compound, is phosphoric acid, boric acid, or combinations thereof.

If an organosilane is used as the silicon-containing compound, the aqueous solution of the above-disclosed acid or aqueous alkaline solution such as ammonia, pyridine, sodium hydroxide, or potassium hydroxide, can be used as catalyst. Aqueous phosphoric acid solution is especially suitable.

The amount of catalyst is generally an effective amount that can produce an emulsion having the characteristics disclosed. It is also an amount, when a silicate is used, that can adjust the pH of the emulsion to 4.5 or less, preferably less than 2.2 such as about 2.0 depending on the catalyst. If an organosilane is used, there is no pH limitation. However, if a higher pH is desired, an aqueous alkali solution can be used to adjust the pH to 7.0 or more, especially 7.0–12.

The heat-resistant water-repellent characteristics of the coated layer produced from the emulsion composition can be effectively improved by either adjusting its pH to alkaline region or, if a silicate is used as the silicon-containing compound, acidifying to acidic region using, for example, phosphoric acid, boric acid, or combinations thereof.

The emulsion composition of the present invention can contain a pigment, a bactericide, an ultraviolet ray absorbent, an antioxidant, or other customarily used additives in a range without affecting the stability of the emulsion and the heat-resistant water-repellent characteristics of the coated layer.

Any methods known to one skilled in the art can be used for the preparation of the emulsion composition of the present invention. The components can be combined in any order to produce the composition.

However, it is preferable to dissolve a surfactant in water followed by addition of a fluorocarbon silane slowly, such that self-condensation of the fluorocarbon silane is inhibited and a hydrolyzed state of the fluorocarbon silane is maintained, with agitation such as stirring, any additives desired, the catalyst, and finally the polymerizable, silicon-containing compound. Generally the pH is not appreciably affected by the addition of the silicon-containing compound. This process can be best used to inhibit self-condensation and to maintain a hydrolyzed state of the fluorocarbon silane.

The water-based emulsion of the present invention can be coated with or to any substrate. The substrates are rendered water-repellent, oil-repellent, or both characteristics by coating the emulsion on the substrate surface followed by drying. Examples of suitable substrates include, but are limited to, aluminum, stainless steel, or other metal sheets, glass, glass sheet, ceramic tile, brick, concrete, stone, wood, masonry, fiber, leather, plastics, or other substrate that can be used under high temperature conditions. The coating of the water-based emulsion on a substrate can be carried out by any methods known to one skilled in the art such as, for example, dipping method, spray method, spin coating method, roll coating method, or other publicly known methods. The dipping method is preferred because it does not cause damage to transparency on a glass substrate.

Heating can also be carried out in order to accelerate the drying process. In general, drying is carried out in a temperature range of about 100–350° C. for about 5 minutes to 24 hours.

Furthermore, before coating the water-based emulsion of the present invention on a substrate, a silicone compound such as, for example, silica, can be coated to form a base or backing layer. By coating the emulsion on top of this layer, the heat-resistant water-repellent characteristics can be maintained for an prolonged period. The substrate after the coating with the emulsion composition, if necessary, can be washed with water after it is dried to remove the residual surfactant.

EXAMPLES

The following examples are provided to illustrate the invention and are not to be construed as to unduly limit the scope of the invention.

The components used in the following application examples and comparative examples are as follows.

The fluorocarbon silane was a mixture of perfluoroalkyl silanes represented by $R_f$—$(CH_2)_2$—$Si\{$—$(O$—$CH_2CH_2)_2$—$OCH_3\}_3$, where $R_f$ is F(k=6, 1–2 wt. %; K=8, 62–64 wt %; k=10, 23–30 wt %; and k=12–18, 2–6 weight %). The surfactant was a nonionic surfactant represented by $R_f'$—$CH_2$ $CH_2$—$O$—$(CH_2CH_2O)_{11}$—H, where $R_f'$ is a perfluoroalkyl group having 3–18 carbon atoms, obtained from E. I. de Nemours & Company, Wilmington, Del. The silicate was tetrakis[2—(2—methoxyethoxy)ethoxy]silicate (Si $(DEGM)_4$). Organoalkoxysilane with the following formula of $(CH_3)Si(OCH_3)_3$ (organomethoxysilane) was used. These chemicals were obtained from Kanto Chemicals Co., Inc., Japan.

Application Example 1

The nonionic surfactant was dissolved in water so that its amount was 30 parts by weight with respect to 100 parts by weight of the fluorocarbon silane to produce a mixture. The fluorocarbon silane at 10 weight % based on the total weight of the water-based emulsion was slowly (2.1 kg was added over a 30 minute period) added to the mixture while stirred using a mechanical stirrer. Self-condensation of the fluorocarbon silane was inhibited and the hydrolyzed state was maintained. While the pH of the emulsion was being measured with a pH meter, phosphoric acid was added. When the pH reached 2.0, the addition of the phosphoric acid was stopped. Si(DEGM)$_4$ was added such that the molar fraction of the Si(DEGM)$_4$ with respect to the fluorocarbon silane was 0.45 to produce a water-based emulsion.

Then, after stirring the water-based emulsion for 2 to 4 hours, it was coated on an aluminum sheet (JIS 1100 with 2.5 cm×5.0 cm, thickness 1 mm) to yield a test specimen.

The water-based emulsion was coated by dip coating. Dip coating was conducted by lowering the test specimen at a speed of 300 mm/min into the water-based emulsion, maintaining it in such a state for 5 minutes, and pulling it up at a speed of 50 mm/min. Drying after coating was carried out at 200° C. for 60 minutes in an oven.

A drop of pure water (2 μl) was placed on the coated layer surface of the test specimen. With a contact angle meter (Kyowa Interfacial Science, Japan), the contact angle was measured. The results are shown in Table 1.

The test specimen was placed in an oven at 375° C. After the time shown in Table 1 had elapsed, the contact angle was measured and is shown in Table 1.

Application Example 2

In Application Example 2, a water-based emulsion containing a fluorocarbon silane hydrolysis product of the same composition as in Application Example 1 was prepared except that boric acid was used instead of the phosphoric acid and the pH was 4.0. A test specimen was prepared, and the same water-repellent test was carried out. The results for contact angles are shown in Table 1.

Comparative Examples 1 through 5

In Comparative Examples 1 through 5, water-based emulsions containing were prepared as in Application Example 1 except that hydrochloric acid, sulfuric acid, nitric acid, acetic acid, and formic acid were used, instead of the phosphoric acid, for adjusting the pH to 2.0. Test specimens were prepared, and the same water-repellent tests were carried out. The results are shown in Table 1.

Comparative Examples 6 through 9

In Comparative Examples 6 through 9, water-based emulsions were prepared as in Application Example 1 except that an aqueous ammonia solution, sodium hydroxide, potassium hydroxide, and pyridine were used (Table 1) instead of phosphoric acid for adjusting pH to 8–11. Test specimens were prepared, and the same water-repellent tests were carried out. The results are shown in Table 1.

TABLE 1[a]

|  | App 1 | App 2 | Com 1 | Com 2 | Com 3 | Com 4 | Com 5 | Com 6 | Com 7 | Com 8 | Com 9 |
| --- | --- | --- | --- | --- | --- | --- | --- | --- | --- | --- | --- |
| pH agent | PA | BA | HA | SA | NA | AA | FA | AH | SH | PH | Py |
| Final pH | 2.0 | 4.0 | 2.0 | 2.0 | 2.0 | 2.0 | 2.0 | 10.8 | 11.2 | 11.0 | 8.1 |
| IWRA | 120 | 120 | 121 | 120 | 119 | 119 | 121 | 118 | 114 | 115 | 120 |
| WRA-15 | 125 | 112 | 8 | 15 | 8 | 18 | 8 | 120 | 114 | 108 | 118 |
| WRA-20 | — | 100 | — | — | — | — | — | — | — | — | — |
| WRA-40 | 104 | — | — | — | — | — | — | 97 | 98 | 81 | 95 |

[a]The abbreviations used were:
App, Application Example;
Com, Comparative Example;
PA, phosphoric acid;
HA, hydrochloric acid;
BA, boric acid;
HA, hydrochloric acid;
AA, acetic acid;
FA, formic acid;
AH, aqueous ammonium hydroxide solution;
SH, aqueous sodium hydroxide solution;
PH, aqueous potassium hydroxide solution;
Py, pyridine;
pH agent denotes an acid or base used for adjusting pH of the emulsion;
Final pH denotes to the final pH of the emulsion;
IWRP denotes initial water-repellent angle (degrees);
WRA-15 denotes water-repellent angle (degrees) after 15 hours at 375° C.;
WRA-20 denotes water-repellent angle (degrees) after 20 hours at 375° C.; and
WRA-40 denotes water-repellent angle (degrees) after 40 hours at 375° C.

Comparing Application Examples 1–2 and Comparative Examples 1–5, coated layers having excellent water-repellent characteristics were obtained for all samples. However, when phosphoric acid or boric acid was used to adjust the emulsion to acidic region, the value of the water-repellent angle of the coated layer surface was about the same as, or higher than, that before aging after 15 hours at 375° C. This indicates that a coated layer had not only water-repellent characteristics alone but also heat-resistant, water-repellent characteristics.

Comparing Application Examples 1–2 and Comparative Examples 6–9, coated layers having excellent heat-resistant water-repellent characteristics were obtained for those emulsions adjusted to acidic region or alkaline region. However, the value of the water-repellent angle of the coated layer surface was more than 100° even after 20 or 40 hours at 375° C. if phosphoric acid or boric acid were used. However, that those using an alkali solution as catalyst had value lower than 100. In other words, the coated layers containing phosphoric acid or boric acid had better durability of heat-resistant water-repellent characteristics than those containing an alkaline pH-adjusting agent. The results also show that the coated layer formed by coating the water-based emulsion of the present invention maintained excellent water-repellent characteristics even under high temperature conditions for a prolonged period.

Application Examples 3–5

Surfactant (30 parts by weight for 100 parts by weight of fluorocarbon silane) was dissolved in water. Fluorocarbon silane shown in Table 2 (10 weight % for the entire weight of water emulsion) was slowly added while using a conventional stirring method for stirring to inhibit fluorocarbon silane from self-condensation and to maintain fluorocarbon silane being hydrolyzed. While using a pH meter for measurement of the pH of the emulsion, an acid or pH-adjusting agent shown in Table 2 was added. The addition was stopped when a final pH shown in Table 2 was obtained. $(CH_3)Si(OCH_3)_3$ was added to obtain molar ratio of $(CH_3)Si(OCH_3)_3$ to fluorocarbon silane of 0.45 to make a water emulsion.

After the water emulsion was stirred for 2–4 hours, it was applied as coating on a glass plate (2.5 cm×5.0 cm, thickness: 3 mm) to make a test sample.

performed in Comparative Example 12. The results are shown in Table 2.

Comparative Examples 13–14

Water emulsion containing fluorocarbon silane hydrolyzate having the same composition as that in Application Example 3 was prepared except that no catalyst was used in Comparative Example 13 and that $(Si(DEGM)_4)$ instead of organomethoxysilane was used. Water-repellency and oil-stain resistance tests were carried out. The results are shown in Table 2.

Water emulsion containing fluorocarbon silane hydrolyzate having composition similar to that obtained in Application Example 3 was prepared in Comparative Example 14 except that no catalyst was used. Water-repellency and oil-stain resistance tests were carried out. The results are shown in Table 2.

TABLE 2[a]

|  | App 3 | App 4 | App 5 | Com 10 | Com 11 | Com 12 | Com 13 | Comp 14 |
|---|---|---|---|---|---|---|---|---|
| Si | OMS | OMS | OMS | SiD | SiD | — | SiD$_4$ | OMS |
| PH agent | PA | HA | Am | PA | HA | — | — | — |
| Final pH | 2.0 | 2.0 | 10.8 | 2.0 | 2.0 | — | 5.0 | 5.0 |
| Substrate | Glass | Glass | Glass | Glass | Glass | Glass | Glass | Glass |
| PCA | 120 | 120 | 119 | 120 | 119 | 121 | 119 | 118 |
| DRBS | Comp | CompE | Comp | SR | SR | None | SR | SR |

[a]See footnotes in Table 1 for abbreviations. Those not shown in Table 1 are
Si, type of silicon compound; OMS, Organomethoxysilane;
SiD, Si(DEGM)$_4$;
Am, ammonia;
—, not present or measured;
PCA, primary contact angle (degrees); and
DRBS, degree for removal of oil stains
(Comp, satins were almost completely removed;
CompE, satins were essentially completely removed;
SR, stains remained; and
none, no stains were removed).

A dip-coating method was used for the water emulsion. The test sample was dipped into the water emulsion at 300 mm/min, held for 5 minutes, and lifted up at 50 mm/min. After it was coated, it was dried at 200° C. for 60 minutes in an oven to prepare a test sample.

Purified water (2 μl) was dripped onto the surface of coated layer of test sample. A contact angle was obtained by measurement using a contact angle meter (made by Kyowa Kaimen Kagaku, Japan). The results are shown in Table 2.

Chicken oil (10 mg) was sprayed onto the surface of the coated layer of test sample, followed by baking at 250° C. for 60 minutes. The burnt oil stain was wiped off five times with gauze, followed by visual observation to see how much burnt oil stain was removed. The results are shown in Table 2.

Comparative Examples 10–11

In Comparative Examples 10 and 11, water emulsion containing fluorocarbon silane hydrolyzate having the same composition as that of water emulsion obtained in Application Examples 3 and 4 was prepared and a test sample was made, except tetrakis(2-(2-methoxyethoxy) ethoxy) silicate (Si (DEGM)$_4$) was used. The same water-repellency test and oil-stain resistance test were performed. The results are shown in Table 2.

Comparative Example 12

Both the same water-repellency test and same oil-stain resistance test performed in Application Example 3 were In Application Example 3, very small amounts of oil remained on the glass surface, but all oil could be easily and almost completely removed by wiping. In Application Example 4, oil was more difficult to remove by wiping than Application Example 3, but essentially all of burnt oil stain could be removed. Stains could be easily and almost completely removed in Application Example 5.

No burnt oil stain could be removed by wiping the surface of glass coated in Comparative Example 12. Oil was spread and remained on the surface of glass in Comparative Examples 10, 11, and 13 obtained with products containing silicate. Oil was spread and remained in Comparative Example 14 obtained with a product containing no pH-adjusting agent but organomethoxysilane.

The results show that the surface of coated layers with compositions containing organomethoxysilane or silicate exhibited good water repellency. Oil-stain resistance was considerably improved by using organomethoxysilane to with either an acid or a pH-adjusting agent. Using phosphoric acid further improved oil-stain resistance.

Application Examples 6–7

A water emulsion was prepared the same as Application Example 3, and applied as coating on a glass plate (2.5 cm×5.0 cm, thickness: 3 mm) to form a test sample.

Purified water (2 μl) was dripped on the surface of coated layer of test sample. A contact angle as obtained by measurement using a contact angle meter (made by Kyowa Kaimen Kagaku, Japan). The results are shown in Table 3.

Each test sample was placed in an oven at 330° C., the contact angle was measured similarly after 6 hours and after 10 hours aging. Results are shown in Table 3.

Comparative Examples 15–17

Each water emulsion was obtained in the same process used in Application Example 3, except for replacing organomethoxysilane with a silica compound shown in Table 3. It was applied as coating on a glass plate (2.5 cm×5.0 cm, thickness: 3 mm) to obtain each test sample on which contact angle was similarly measured as in Application Example 6. Results are shown in Table 3.

TABLE 3[a]

|  | App 6 | App 7 | Com 15 | Com 16 | Com 17 |
|---|---|---|---|---|---|
| Si | OMS | OMS | EpS | AS | ECS |
| pH | PA | HA | PA | PA | PA |
| Final pH | 2.2 | 2.2 | 2.2 | 2.2 | 2.2 |
| Substrate | Glass | Glass | Glass | Glass | Glass |
| PWRA | 116 | 114 | 116 | 117 | 116 |
| WRA-6 | 138 | 112 | 101 | 46 | 109 |
| WRA-10 | 137 | 113 | 73 | 33 | 97 |

[a]See Tables 1 or 2 for footnotes. Those not shown in Table 2 are:
EpS, epoxysilane;
AS, aminnosilane;
ECS, epoxycyclohexylsilane;
PWRA, primary water-repellency angle (degree);
WRA-6, water-repellency angle (degree) after 6 hours at 330° C.;
WRA-10, water-repellency angle (degree) after 10 hours at 330° C.

In Application Example 6, water-repellency angle on the surface of coated layer after 6 hours and after 10 hours at 330° C. was better than that before aging, indicating that a coated layer having good water repellency at high temperature was obtained.

In Comparative Examples 15–17, a similar primary water-repellency angle obtained in Application Example 6 was obtained by a silicon compound other than organomethoxysilane, and that a coated layer having water repellency was obtained. However, each water-repellency angle after 10 hours at 330° C. was reduced, even phosphoric acid was used, and no coated layer had any water repellency at high temperature.

Application Example 7, in which water emulsion containing organomethoxysilane was used as in Application Example 6, showed that a coated layer had good water repellency at high temperature even though hydrochloric acid was used as pH-adjusting agent.

Application Example 8

Water emulsion was prepared similar to Application Example 3 and was coated on an aluminum plate (JIS1100 2.5 cm×5.0 cm, thickness: 1 mm) to obtain a test sample.

Purified water (2 μl) was dripped on the surface of coated layer of test sample. Contact angle was measured using a contact angle meter (made by Kyowa Kaimen Kagaku, Japan). The results are shown in Table 4.

Each test sample was placed in an oven at 370° C. and after 40 hours, the contact angle was similarly measured. Results are shown in Table 4.

Comparative Examples 18–21

Each water emulsion was obtained the same as Application Example 3, except for using a silicon compound shown in Table 4. It was coated on an aluminum plate (JIS1100, 2.5 cm×5.0 cm, thickness: 1 mm) to obtain test sample. A contact angle was measured as in Application Example 6. Results are shown in Table 4.

TABLE 4[a]

|  | App 8 | Com 18 | Com 19 | Com 20 | Com 21 |
|---|---|---|---|---|---|
| Si | OMS | SiD | SiD | SiD | OMS |
| pH agent | PA | HA | PA | AH | — |
| Final pH | 2.2 | 2.2 | 2.2 | 10.8 | 5.0 |
| Substrate | Aluminum | Aluminum | Aluminum | Aluminum | Aluminum |
| PWRA | 120 | 117 | 120 | 112 | 118 |
| WRA-40[b] | 105 | 10 | 15 | 45 | 31 |

[a]See previous footnotes.
[b]The temperature was 370° C.

Application Example 8 and Comparative Examples 18–21 had about the same primary water-repellency angles showing that each coated layer had good water repellency. However, Comparative Examples 18–20, in which silicate was used, had significantly reduced water-repellency angle after 40 hours at 370° C. while Application Example 8 had water repellency of 105 degrees after 40 hours at 370° C. The results demonstrate that a coated layer having good water repellency at high temperature and good durability could be obtained using organomethoxysilane.

Comparative Example 21 had considerably reduced water-repellency angle after 40 hours at 370° C., indicating that even with use of organomethoxysilane, the lack of a catalyst failed to yield a good water-repellency at high temperature.

The above results show that a coated layer produced from water emulsions containing fluorocarbon silane or its hydrolyzate exhibits good water repellency at high temperature and good oil-stain resistance. A coated product made by applying water emulsion of the present invention was effective to remove oil stains easily, and can maintain good water repellency at high temperature.

What is claimed is:

1. A composition comprising a fluorocarbon silane or hydrolyzate thereof; a surfactant; a polymerizable, silicon-containing compound; and a catalyst wherein said fluorocarbon silane has the formula Of $R_f$—$(CH_2)_p$Si{—(O—CH$_2$CH$_2$)$_n$—OR'}$_3$, $R_f$ is a $C_{3-18}$ perfluoroalkyl group or combinations thereof, each R' is independently a $C_{1-3}$ alkyl groups or combinations thereof, p is 2 to 4, inclusive, and n is 2 to 10, inclusive; said silicon-containing compound is selected from the group consisting of a silicate, an organosilane, and combinations thereof; and said catalyst is phosphoric acid, boric acid, hydrochloric acid, nitric acid, acetic acid, oxalic acid, ammonia, pyridine, sodium hydroxide, or potassium hydroxide, or combinations of two or more thereof if said silicon-containing compound is said organosilane or phosphoric acid, boric acid, or combinations thereof if said silicon-containing compound is said silicate.

2. A composition according to claim 1 wherein said silicon-containing compound is said silicate having the formula of Si—$R_4$, R is selected from the group consisting of OCH$_3$, OCH$_2$CH$_3$, (OCH$_2$CH$_2$)$_m$OCH$_3$, and combinations thereof, and m is 1 to 10, inclusive; and said catalyst is said phosphoric acid, said boric acid, or combinations thereof.

3. A composition according to claim 1 wherein said fluorocarbon silane is selected from the group consisting of perfluoroalkylethyltris(2-(2-methoxyethoxy)ethoxy)silane, perfluoroalkylethyltris (2-(2-(2-methoxyethoxy)ethoxy) ethoxy)silane, and combinations thereof.

4. A composition according to claim 2 wherein said fluorocarbon silane is perfluoroalkylethyltris(2-(2-methoxyethoxy)ethoxy)silane, perfluoroalkylethyltris(2-(2-(2-methoxyethoxy)ethoxy)ethoxy)silane, or combinations thereof.

5. A composition according to claim 1 wherein said surfactant $R'_f$—$CH_2CH_2$—$O$—$(CH_2CH_2O)_{11}$—H, $C_9H_{19}$—$C_6H_4$—$O$—$(CH_2CH_2O)_{50}$—H, $R'_f$—$CH_2CH_2SCH_2CH(OH)CH_2N(CH_3)_3{}^+Cl^-$, $C_{12}H_{25}(OCH_2CH_2)_4OSO_3{}^{-NH_4+}$, $C_{12}H_{27}$—$C_6H_4$—$SO_3$—$Na^+$, or combinations thereof, and $R_f'$ is a perfluoroalkyl group having about 3 to about 18 carbon atoms.

6. A composition according to claim 2 wherein said surfactant $R'_f$—$CH_2CH_2$—$O$—$(CH_2CH_2O)_{11}$—H, $C_9H_{19}$—$C_6H_4$13 $O$—$(CH_2CH_2O)_{50}$—H, $R'_f$—$CH_2CH_2SCH_2CH(OH)CH_2N(CH_3)_3{}^+Cl^-$, $C_{12}H_{25}(OCH_2CH_2)_4OSO_3{}^-NH_4{}^+$, $C_{12}H_{27}$—$C_6H_4$—$SO_3$—$Na^+$, or combinations thereof, and $R_f'$ is a perfluoroalkyl group having about 3 to about 18 carbon atoms.

7. A composition according to claim 3 wherein said surfactant $R'_f$—$CH_2CH_2$—$O$—$(CH_2CH_2O)_{11}$—H, $C_9H_{19}$—$C_6H_4$—$O$—$(CH_2CH_2O)_{50}$—H, $R'_f$—$CH_2CH_2SCH_2CH(OH)CH_2N(CH_3)_3{}^+Cl^-$, $C_{12}H_{25}(OCH_2CH_2)_4OSO_3{}^-NH_4{}^+$, $C_{12}H_{27}$—$C_6H_4$—$SO_3$—$Na^+$, or combinations thereof, and $R_f'$ is a perfluoroalkyl group having about 3 to about 18 carbon atoms.

8. A composition according to claim 4 wherein said surfactant $R'_f$—$CH_2CH_2$—$O$—$(CH_2CH_2O)_{11}$—H, $C_9H_{19}$—$C_6H_4$—$O$—$(CH_2CH_2O)_{50}$—H, $R'_f$—$CH_2CH_2SCH_2CH(OH)CH_2N(CH_3)_3{}^+Cl^-$, $C_{12}H_{25}(OCH_2CH_2)_4OSO_3{}^{-NH_4+}$, $C_{12}H_{27}$—$C_6H_4$—$Na^+$, or combinations thereof, and $R_f'$ is a perfluoroalkyl group having about 3 to about 18 carbon atoms.

9. A composition according to claim 8 wherein said surfactant has a HLB value greater than 12.

10. A composition according to claim 4 wherein said surfactant has a HLB value greater than 16.

11. A composition according to claim 1 wherein said fluorocarbon silane is perfluoroalkylethyltris(2-(2-methoxyethoxy)ethoxy)silane, perfluoroalkylethyltris (2-(2-(2-methoxyethoxy)ethoxy)ethoxy)silane, or combinations thereof; and said silicon-containing compound is said silicate having the formula of Si—$R_4$, R is selected from the group consisting of $OCH_3$, $OCH_2CH_3$, $(OCH_2CH_2)_mOCH_3$, and combinations thereof, and m is 1 to 10, inclusive.

12. A composition according to claim 11 wherein said surfactant has a HLB value greater than 16.

13. A composition according to claim 11 wherein said silicon-containing compound is Si—$((OCH_2CH_2)_2OCH_3)_4$; and said surfactant is selected from the group consisting of $R'_f$—$CH_2CH_2$—$O$—$(CH_2CH_2O)_{11}$—H, $C_9H_{19}$—$C_6H_4$—$O$—$(CH_2CH_2O)_{50}$—H, $R'_f$—$CH_2CH_2SCH_2CH(OH)CH_2N(CH_3)_3{}^+Cl^{31}$, $C_{12}H_{25}(OCH_2CH_2)_4OSO_3{}^-NH_4{}^+$, $C_{12}H_{27}$—$C_6H_4$—$SO_3$—$Na^{30}$, and combinations thereof, and $R_f'$ is a perfluoroalkyl group having about 3 to about 18 carbon atoms.

14. A composition according to claim 1 wherein said silicon-containing compound is said organosilane having the formula of $R^2{}_qSi(OR^3)_{4-q}$, each $R^2$ is independently an alkyl group having 1 to 10 carbon number, each $R^3$ is independently an alkyl group having 1 to about 3 carbon number, and q is 1 to 3, inclusive.

15. A composition according to claim 14 wherein said fluorocarbon silane perfluoroalkylethyltris(2-(2-methoxyethoxy)ethoxy)silane, perfluoroalkylethyltris (2-(2-(2-methoxyethoxy)ethoxy)ethoxy)silane, or combinations thereof.

16. A composition according to claim 15 wherein said surfactant has a HLB value greater than 12.

17. A composition according to claim 16 wherein said surfactant has a HLB value greater than 16.

18. A composition according to claim 15 wherein said surfactant is selected from the group consisting of $R'_f$—$CH_2CH_2$—$O$—$(CH_2CH_2O)_{11}$—H, $C_9H_{19}$—$C_6H_4$—$O$—$(CH_2CH_2O)_{50}$—H, $R'_f$—$CH_2CH_2SCH_2CH(OH)CH_2N(CH_3)_3{}^{30}Cl^{31}$, $C_{12}H_{25}(OCH_2CH_2)_4OSO_3{}^-NH_4{}^+$, $C_{12}H_{27}$—$C_6H_4$—$SO_3$—$Na^+$, and combinations thereof, and $R_f'$ is a perfluoroalkyl group having about 3 to about 18 carbon atoms.

19. A composition according to claim 17 wherein said surfactant is selected from the group consisting of $R'_f$—$CH_2CH_2$—$O$—$(CH_2CH_2O)_{11}$—H, $C_9H_{19}$—$C_6H_4$—$O$—$(CH_2CH_2O)_{50}$—H, $R'_f$—$CH_2CH_2SCH_2CH(OH)CH_2N(CH_3)_3{}^+Cl^-$, $C_{12}H_{25}(OCH_2CH_2)_4OSO_3{}^-NH_4{}^+$, $C_{12}H_{27}$—$C_6H_4$—$SO_3$—$Na^+$, and combinations thereof, and $R_f'$ is a perfluoroalkyl group having about 3 to about 18 carbon atoms.

20. A composition according to claim 14 wherein said silicon-containing compound is organomethoxysilane; said surfactant has a HLB value greater than 12; and said surfactant is selected from the group consisting of $R'_f$—$CH_2CH_2$—$O$—$(CH_2CH_2O)_{11}$—H, $C_9H_{19}$—$C_6H_4$—$O$—$(CH_2CH_2O)_{50}$—H, $R'_f$—$CH_2CH_2SCH_2CH(OH)CH_2N(CH_3)_3{}^+Cl^-$, $C_{12}H_{25}(OCH_2CH_2)_4OSO_3{}^-NH_4{}^+$, $C_{12}H_{27}$—$C_6H_4$—$SO_3$—$Na^+$, and combinations thereof, and $R_f'$ is a perfluoroalkyl group having about 3 to about 18 carbon atoms.

21. A composition according to claim 20 wherein said surfactant has a HLB value greater than 16.

22. A process comprising contacting a substrate surface with a composition wherein said composition is as recited in claim 1, 2, 3, 4, 5, 6, 7, 8, 9, 10, 11, 12, 13, 14, 15, 16, 17, 18, 19, 20, or 21, and said substrate is metal, glass, ceramic, tile, brick, concrete, wood, masonry, fiber, leather, plastics, or stone.

23. A process comprising dissolving a surfactant in water to produce a surfactant-water mixture; combining said surfactant-water mixture with a fluorocarbon silane to produce a silane-surfactant mixture; combining said silane-surfactant mixture with a catalyst to produce a pH-adjusted mixture; and combining said pH-adjusted mixture with polymerizable, silicon-containing compound to produce an emulsion wherein said fluorocarbon silane has the formula of $R_f$—$(CH_2)_p$—$Si\{$—$(O$—$CH_2CH_2)_n$—$OR'\}_3$, $R_f$ is a $C_{3\text{-}18}$ perfluoroalkyl group or combinations thereof, each R' is independently a $C_{1\text{-}3}$ alkyl groups or combinations thereof, p is 2 to 4, inclusive, and n is 2 to 10, inclusive; said silicon-containing compound is selected from the group consisting of a silicate, an organosilane, and combinations thereof; and said catalyst is phosphoric acid, boric acid, hydrochloric acid, nitric acid, acetic acid, oxalic acid, ammonia, pyridine, sodium hydroxide, or potassium hydroxide, or combinations thereof if said silicon containing or phosphoric acid, boric acid, or combinations thereof if said silicon-containing compound is said silicate.

24. A process according to claim 23 wherein said surfactant has a HLB values greater than 16.

25. A process according to claim 25 wherein said surfactant is selected from the group consisting of $R'_f$—$CH_2CH_2$—$O$—$(CH_2CH_2O)_{11}$—H, $C_9H_{19}$—$C_6H_4$—$O$—$(CH_2CH_2O)_{50}$—H, $R'_f$—$CH_2CH_2SCH_2CH(OH)CH_2N(CH_3)_3{}^+Cl^{31}$, $C_{12}H_{25}(OCH_2CH_2)_4OSO_3{}^-NH_4{}^+$, $C_{12}H_{27}$—$C_6H_4$—$SO_3$—$Na^+$, and combinations thereof, and $R_f'$ is a perfluoroalkyl group having about 3 to about 18 carbon atoms.

26. A process according to claim 23 wherein said silicon-containing compound is Si—$((OCH_2CH_2)_2OCH_3)_4$; said surfactant has a HLB values greater than 12; and surfactant is $R'_f$—$CH_2CH_2$—$O$—$(CH_2CH_2O)_{11}$—H, $C_9H_{19}$—$C_6H_4$—$O$—$(CH_2CH_2O)_{50}$—H, $R'_f$—$CH_2CH_2SCH_2CH(OH)CH_2N(CH_3)_3{}^+Cl^-$, $C_{12}H_{25}(OCH_2CH_2)_4OSO_3{}^-NH_4{}^+$, $C_{12}H_{27}$—$C_6H_4$—$SO_3$—$Na^+$, or combinations thereof, and $R_f'$ is a perfluoroalkyl group having about 3 to about 18 carbon atoms.

* * * * *

UNITED STATES PATENT AND TRADEMARK OFFICE
CERTIFICATE OF CORRECTION

PATENT NO. : 6,709,504 B2   Page 1 of 1
DATED : March 23, 2004
INVENTOR(S) : Iwato Satoko and Kaku Mureo It is certified that error appears in the above-identified patent and that said Letters Patent is hereby corrected as shown below:

Column 11,
Line 47, delete "$C_{12}H_{27}\text{-}C_6H_4\text{-}SO_3\text{-}Na^{30}$" and substitute therefor
-- $C_{12}H_{27}\text{-}C_6H_4\text{-}SO_3\text{-}Na^+$ --

Column 11, line 67 through Column 12, line 1,
Delete "$R'_f\text{-}CH_2CH_2SCH_2CH(OH)CH_2N(CH_3)_3{}^{30}Cl^{31}$" and substitute therefor
-- $R'_f\text{-}CH_2CH_2SCH_2CH(OH)CH_2N(CH_3)_3{}^+Cl^-$ --

Column 12,
Lines 9-10, "$R'_f\text{-}CH_2CH_2SCH_2CH(OH)CH_2N(CH_3)_3{}^+Cl.$" and substitute therefor
-- $R'_f\text{-}CH_2CH_2SCH_2CH(OH)CH_2N(CH_3)_3{}^+Cl^-$ --
Line 53, delete "$R'_f\text{-}CH_2CH_2SCH_2CH(OH)CH_2N(CH_3)_3{}^+Cl^{31}$" and substitute therefore
-- $R'_f\text{-}CH_2CH_2SCH_2CH(OH)CH_2N(CH_3)_3{}^+Cl^-$ --

Signed and Sealed this

Thirtieth Day of November, 2004

JON W. DUDAS
*Director of the United States Patent and Trademark Office*